United States Patent
Ko et al.

(10) Patent No.: US 11,741,755 B2
(45) Date of Patent: Aug. 29, 2023

(54) METHOD AND APPARATUS FOR RECOGNIZING SIGN LANGUAGE OR GESTURE USING 3D EDM

(71) Applicant: Korea Electronics Technology Institute, Seongnam-si (KR)

(72) Inventors: Sang Ki Ko, Suwon-si (KR); Hye Dong Jung, Seoul (KR); Han Mu Park, Seongnam-si (KR); Chang Jo Kim, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 250 days.

(21) Appl. No.: 16/942,985

(22) Filed: Jul. 30, 2020

(65) Prior Publication Data

US 2021/0034846 A1 Feb. 4, 2021

(30) Foreign Application Priority Data

Aug. 1, 2019 (KR) .................. 10-2019-0093807

(51) Int. Cl.
*G06V 40/00* (2022.01)
*G06V 40/20* (2022.01)
(Continued)

(52) U.S. Cl.
CPC .............. *G06V 40/28* (2022.01); *G06F 3/011* (2013.01); *G06F 3/017* (2013.01); *G06N 3/045* (2023.01);
(Continued)

(58) Field of Classification Search
CPC .... G06V 40/28; G06V 10/454; G06V 10/764; G06V 10/82; G06V 20/64; G06V 40/20;
(Continued)

(56) References Cited

U.S. PATENT DOCUMENTS 9,014,905 B1 * 4/2015 Kretzschmar .......... G05D 1/021
 701/28
9,383,895 B1 * 7/2016 Vinayak .............. G06F 3/04883
(Continued)

FOREIGN PATENT DOCUMENTS

KR  10-2014-0040527 A   4/2014
KR  20170126909 A *  11/2017
(Continued)

OTHER PUBLICATIONS

Korean Office Action dated Oct. 21, 2019 in corresponding Korean Patent Application No. 10-2019-0093807 (3 pages in English, 5 pages in Korean).

*Primary Examiner* — Patrick F Riegler
(74) *Attorney, Agent, or Firm* — NSIP Law

(57) ABSTRACT

A method and apparatus for recognizing a sign language or a gesture by using a three-dimensional (3D) Euclidean distance matrix (EDM) are disclosed. The method includes a two-dimensional (2D) EDM generation step for generating a 2D EDM including information about distances between feature points of a body recognized in image information by a 2D EDM generator, a 3D EDM generation step for receiving the 2D EDM and generating a 3D EDM by using a first deep learning neural network trained with training data in which input data is a 2D EDM and correct answer data is a 3D EDM by a 3D EDM generator, and a recognition step for recognizing a sign language or a gesture based on the 3D EDM.

14 Claims, 10 Drawing Sheets

(51) Int. Cl.
*G06F 3/01* (2006.01)
*G06N 3/084* (2023.01)
*G10L 13/00* (2006.01)
*G06N 3/045* (2023.01)
*G10L 15/24* (2013.01)
*G06V 10/764* (2022.01)
*G06V 10/82* (2022.01)
*G06V 10/44* (2022.01)

(52) U.S. Cl.
CPC ........... *G06N 3/084* (2013.01); *G06V 10/454* (2022.01); *G06V 10/764* (2022.01); *G06V 10/82* (2022.01); *G10L 13/00* (2013.01); *G10L 15/24* (2013.01)

(58) Field of Classification Search
CPC ....... G06F 3/011; G06F 3/017; G06N 3/0454; G06N 3/084; G06N 3/0445; G06N 3/082; G06N 3/088; G06N 3/08; G06N 3/02; G10L 13/00; G10L 15/24; G06K 9/627; G06T 5/002
See application file for complete search history.

(56) References Cited

U.S. PATENT DOCUMENTS

| | | | |
|---|---|---|---|
| 10,058,290 B1* | 8/2018 | Proud | A61B 5/749 |
| 10,283,110 B2* | 5/2019 | Bellegarda | G10L 15/063 |
| 10,929,654 B2* | 2/2021 | Iqbal | G06T 7/73 |
| 2011/0158476 A1* | 6/2011 | Fahn | G06V 40/172 |
| | | | 901/50 |
| 2012/0323521 A1* | 12/2012 | De Foras | G06F 3/0346 |
| | | | 702/141 |
| 2015/0262362 A1* | 9/2015 | Zaytsev | G06V 10/752 |
| | | | 382/103 |
| 2016/0093278 A1* | 3/2016 | Esparza | G10D 13/26 |
| | | | 84/730 |
| 2019/0303724 A1* | 10/2019 | Linden | G06F 18/217 |
| 2020/0034609 A1* | 1/2020 | Chandler | G06V 10/764 |
| 2020/0182995 A1* | 6/2020 | Zeng | G01S 7/006 |

FOREIGN PATENT DOCUMENTS

| | | | |
|---|---|---|---|
| KR | 10-2018-0108501 A | 10/2018 | |
| WO | WO 2011/080923 A1 | 7/2011 | |
| WO | WO-2019089432 A1 * | 5/2019 | ............. G01S 15/32 |

* cited by examiner

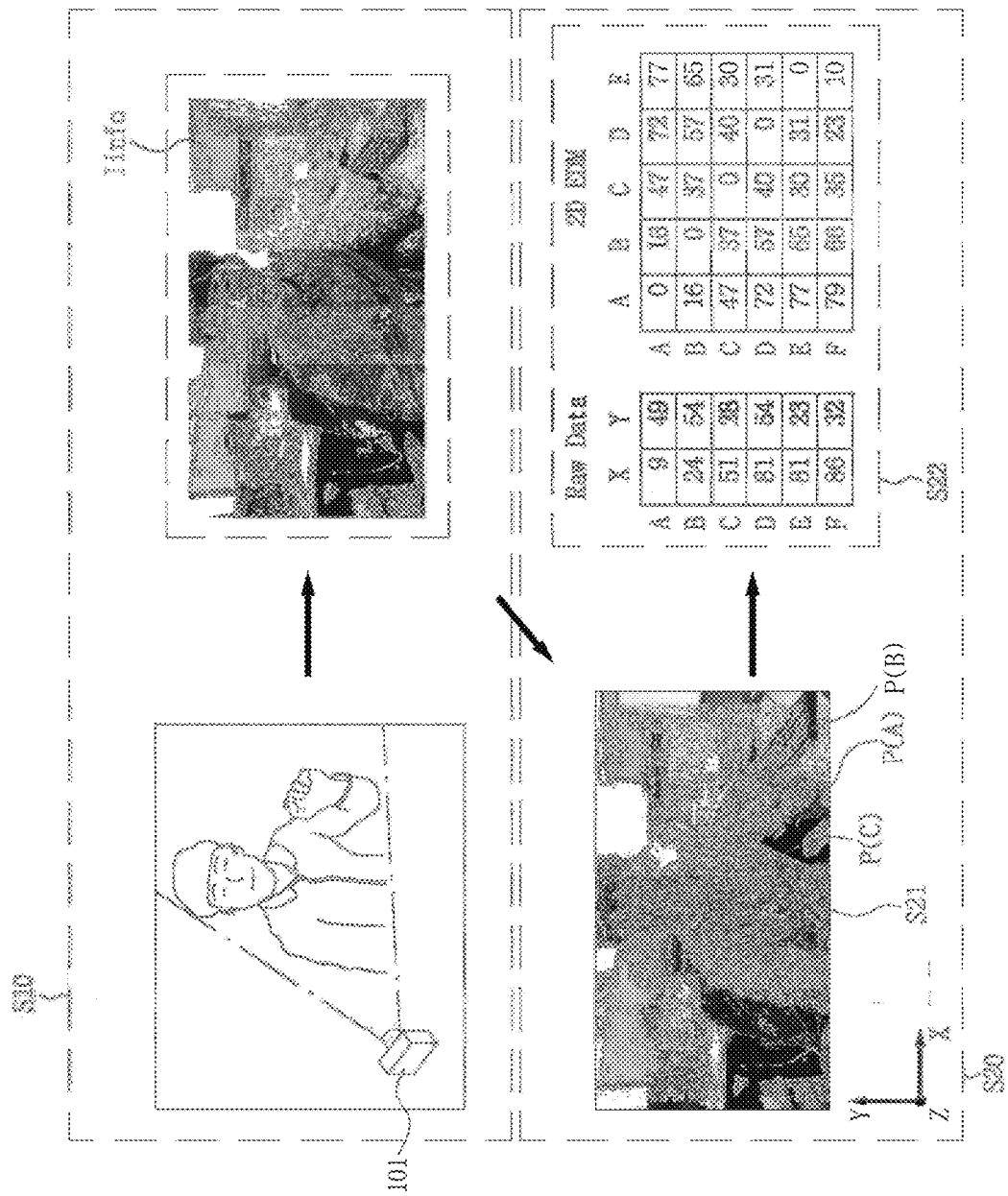

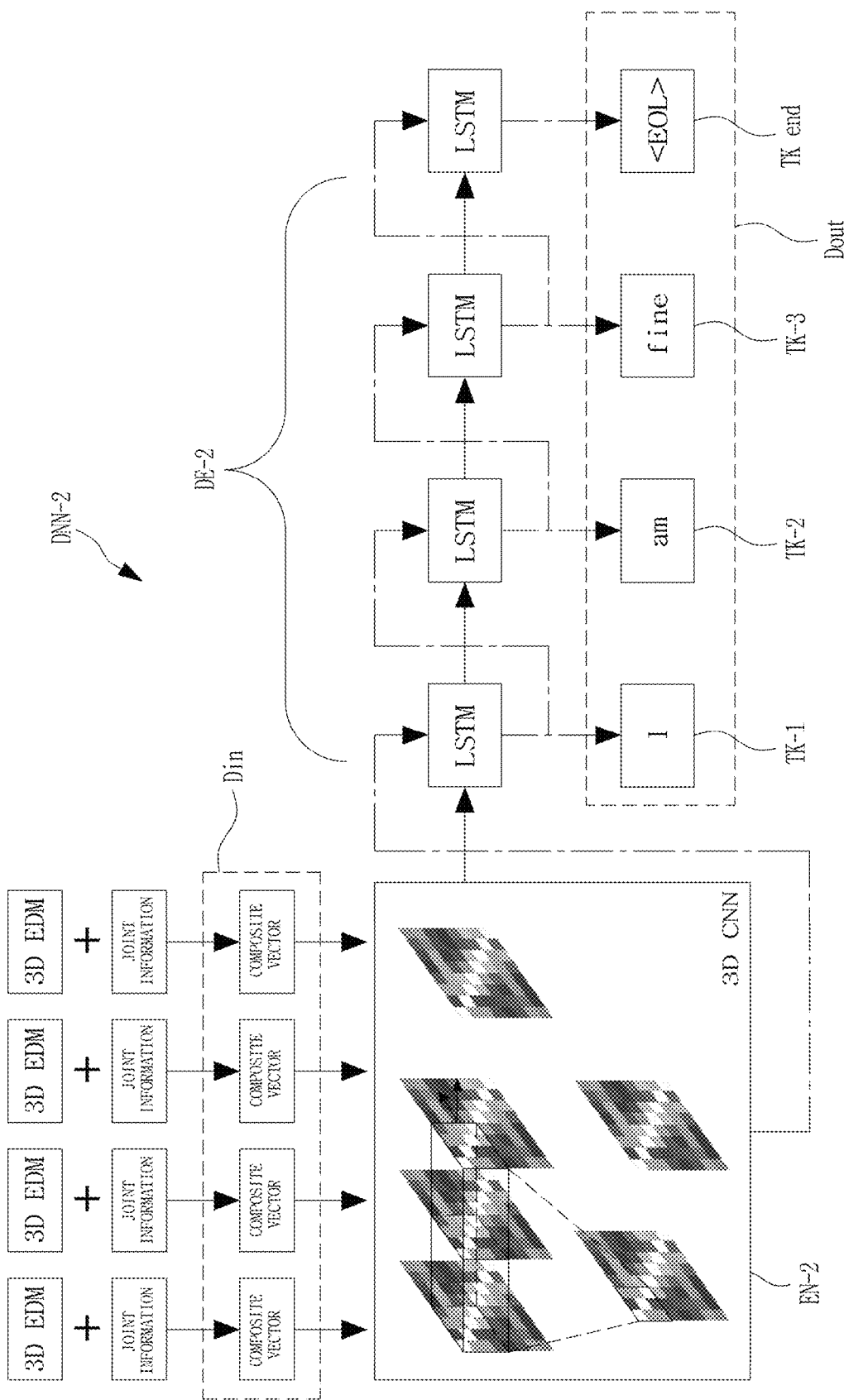

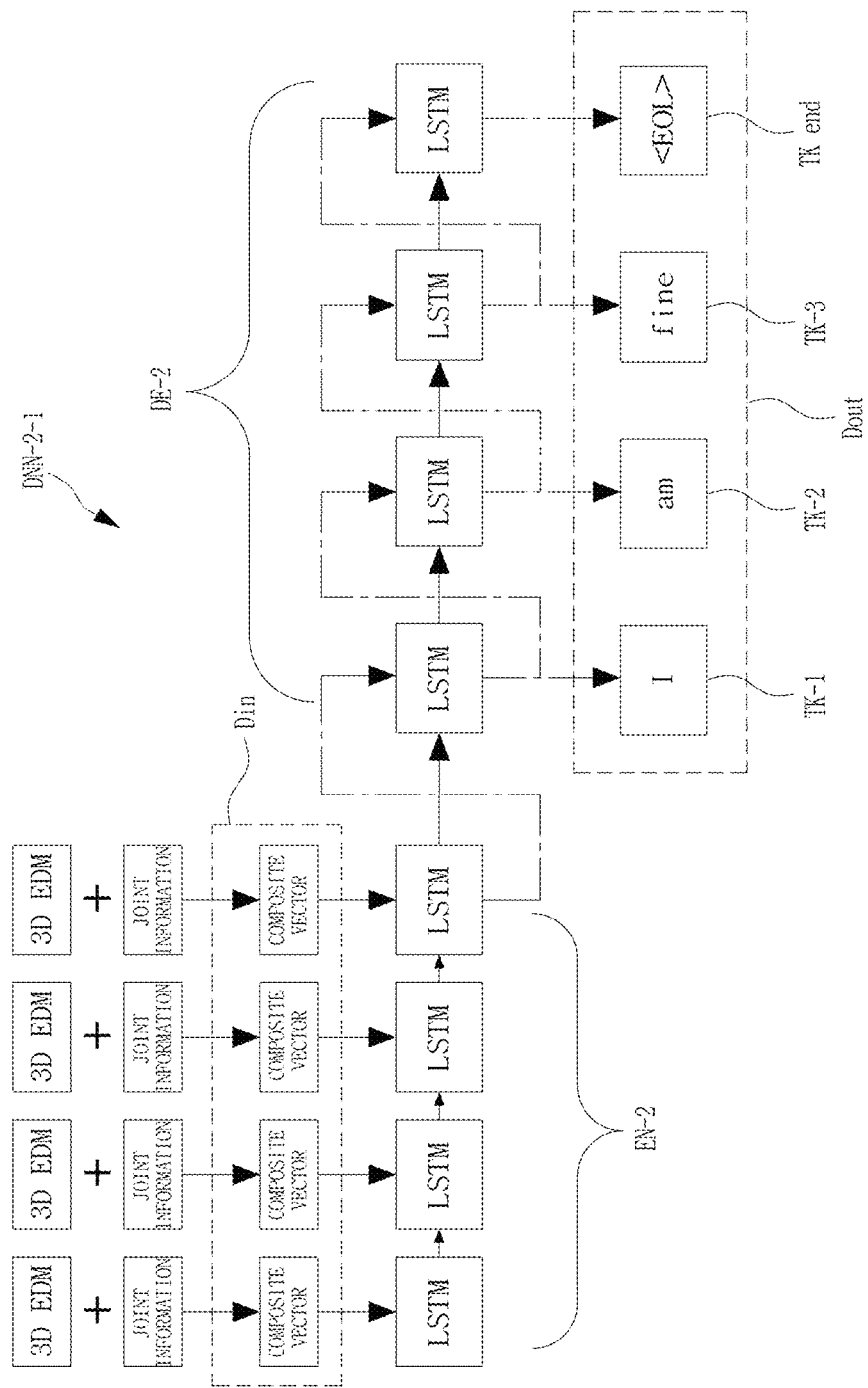

METHOD AND APPARATUS FOR RECOGNIZING SIGN LANGUAGE OR GESTURE USING 3D EDM

CROSS REFERENCE TO RELATED APPLICATION

The present application claims priority to Korean Patent Application No. 10-2019-0093807, filed Aug. 1, 2019, the entire contents of which is incorporated herein for all purposes by this reference.

BACKGROUND OF THE INVENTION

Field of the Invention

The present invention relates to a method and apparatus for recognizing a sign language or a gesture by using a three-dimensional (3D) Euclidean distance matrix (EDM).

Description of the Related Art

In a conventional computer vision-based sign language or gesture recognition technology, a depth camera is used to recognize a motion of a sign language user in three dimensions or through sensor gloves worn on both hands of the sign language user. This technology has limitations in accurately recognizing a motion of a sign language user without a depth camera or sensor gloves.

Conventionally, there is a technique of capturing an image of a sign language user by a general camera (such as a red, green, blue (RGB) camera) and recognizing a sign language from the captured image. It is difficult to accurately recognize the sign language in view of various environmental variables including other people, surrounding objects, and the angle or distance between the user and the camera as well as the sign language user.

In the case of a conventional technique of extracting the coordinates of two-dimensional (2D) feature points such as a person's face, body, hands, feet, and so on from a general RGB image, normalizing the coordinates, and training a neural network that recognizes a sign language with the normalized coordinates, the coordinates of the 2D feature points incompletely reflect a pose in a 3D space. Therefore, a recognition rate is significantly decreased depending on a distance or angle at which the image has been taken. When the 2D feature points are not detected properly, the recognition rate drops significantly.

RELATED ART DOCUMENT

Patent Document 1

Korea Patent Application Publication No. 10-2014-0040527 A1

SUMMARY OF THE INVENTION

Therefore, the present invention has been made in view of the above problems, and it is an object of the present invention to recognize a sign language or a gesture based on image information generated by capturing the sign language or the gesture.

It is another object of the present invention to extract a position relationship between feature points of a body in the form of a two-dimensional (2D) Euclidean distance matrix (EDM) from image information, generate a 3D EDM based on the 2D EDM by using a deep learning neural network, and use the 3D EDM with recovered depth information as input data for sign language or gesture recognition.

It is a further object of the present invention to correct an error that may be included in a 3D EDM generated by using a deep learning neural network, based on a general motion range of a human joint.

In accordance with the present invention, the above and other objects can be accomplished by the provision of a method of recognizing a sign language or a gesture by using a 3D EDM. The method includes a 2D EDM generation step for generating a 2D EDM including information about distances between feature points of a body recognized in image information by a 2D EDM generator, a 3D EDM generation step for receiving the 2D EDM and generating a 3D EDM by using a first deep learning neural network trained with training data in which input data is a 2D EDM and correct answer data is a 3D EDM by a 3D EDM generator, and a recognition step for recognizing a sign language or a gesture based on the 3D EDM.

Further, the 2D EDM generation step may include a feature point extraction step for extracting the feature points of the body from the image information and recognizing coordinates of the feature points by the 2D EDM generator, and an EDM generation step for generating the 2D EDM by developing the information about the distances between the feature points into an EDM by the 2D EDM generator.

Further, the method may further include a joint information generation step for generating joint information by recognizing angles of joints of the body based on the 3D EDM by a joint information generator, after the 3D EDM generation step, and an error correction step for correcting the angle of a joint outside a general body motion range in the joint information by an error corrector, after joint information generation step.

Further, in the error correction step, the error corrector may receive the joint information and generate corrected joint information by correcting the angle of the joint outside the general body motion range in the joint information and recovering an angle of a joint related to a feature point unrecognized in the 2D EDM generation step by using a third deep learning neural network trained with training data including the general body motion range.

Further, the method may further include a smoothing step for removing an outlier by averaging 3D EDMs or pieces of joint information within a predetermined sequence range among a plurality of 3D EDMs or a plurality of pieces of joint information generated according to sequences and correcting a 3D EDM or joint information based on the average by the error corrector.

Further, the first deep learning neural network may be in a fully connected layer structure or a convolutional layer structure, the fully connected layer structure obtaining output values by repeating a linear layer, a rectified linear units (ReLU) layer, and a dropout layer in any dimensions in three steps, performing back propagation to minimize the sum of the squares of differences between the output values and correct answer values, and using a vector converted from top-right triangle values of a 2D EDM as input data, and the convolutional layer structure receiving a 2D EDM, recovering the 2D EDM to an original size through two steps of a convolutional layer, a batch normalization layer, an ReLU layer, and a dropout layer and then two steps of a deconvolutional layer, the batch normalization layer, and the ReLU layer, obtaining output values by multiplying a linear matrix at each position of the matrix, and performing back propagation to minimize the sum of the squares of differences between the output values and correct answer values.

Further, the recognition step may include a sign language-voice language translation step for receiving a sign language sentence including a sequence of 3D EDMs and translating the sign language sentence to a voice language sentence by using a $(2\text{-}1)^{th}$ deep learning neural network trained with training data in which input data includes a 3D EDM and correct answer data is a voice language sentence by the recognizer, or a gesture-meaning translation step for receiving a gesture including a sequence of 3D EDMs and translating the gesture to a gesture meaning by using a $(2\text{-}2)^{th}$ deep learning neural network trained with training data in which input data includes a 3D EDM and correct answer data is a gesture meaning by the recognizer.

Further, in the sign language-voice language translation step, the $(2\text{-}1)^{th}$ deep learning neural network may be in a sequence-to-sequence structure including an encoder and a decoder, the encoder being a 3D convolutional neural network that receives a first composite vector in a matrix structure including the 3D EDM and the corrected joint information according to a sequence, and computes a predetermined number of first composite vectors by a 3D filter, and the decoder being a long short-term memory (LSTM)-based recurrent neural network structure. In the training data, input data may be the first composite vector and correct answer data may be a voice language sentence. In the sign language-voice language translation step, a sign language sentence including a sequence of 3D EDMs and joint information may be input to the $(2\text{-}1)^{th}$ deep learning neural network trained with the training data and translated to a voice language sentence.

Further, in the sign language-voice language translation step, the $(2\text{-}1)^{th}$ deep learning neural network may be in a sequence-to-sequence structure including an encoder and a decoder, the encoder being an LSTM-based recurrent neural network that receives and computes a second composite vector generated by converting the 3D EDM and the corrected joint information to a one-dimensional (1D) vector at each sequence and then subjecting 1D vectors to a concatenation function, and the decoder being an LSTM-based recurrent neural network structure. In the training data, input data may be the second composite vector and correct answer data may be a voice language sentence. In the sign language-voice language translation step, a sign language sentence including a sequence of 3D EDMs and joint information may be input to the $(2\text{-}1)^{th}$ deep learning neural network trained with the training data and translated to a voice language sentence.

In accordance with an aspect of the present invention, the above and other objects can be accomplished by the provision of an apparatus for recognizing a sign language or a gesture by using a 3D EDM. The apparatus includes a 2D EDM generator configured to generate a 2D EDM including information about distances between feature points of a body recognized in image information, a 3D EDM generator configured to receive the 2D EDM and generate a 3D EDM by using a first deep learning neural network trained with training data in which input data is a 2D EDM and correct answer data is a 3D EDM, and a recognizer configured to recognize a sign language or a gesture based on the 3D EDM.

Further, the recognizer may be configured to perform a sign language-voice language translation step for receiving a sign language sentence including a sequence of 3D EDMs and translating the sign language sentence to a voice language sentence by using a $(2\text{-}1)^{th}$ deep learning neural network trained with training data in which input data includes a 3D EDM and correct answer data is a voice language sentence, or a gesture-meaning translation step for receiving a gesture including a sequence of 3D EDMs and translating the gesture to a gesture meaning by using a $(2\text{-}2)^{th}$ deep learning neural network trained with training data in which input data includes a 3D EDM and correct answer data is a gesture meaning.

Further, the apparatus may further include a joint information generator configured to generate joint information by recognizing angles of joints of the body based on the 3D EDM, and an error corrector configured to correct the angle of a joint outside a general body motion range in the joint information and recover an angle of a joint related to a feature point which has not been recognized by the 2D EDM generator.

Further, the error corrector may be configured to perform an error correction step for receiving the joint information and generating corrected joint information by correcting the angle of the joint outside the general body motion range in the joint information and recovering an angle of a joint related to a feature point unrecognized in the 2D EDM generation step by using a third deep learning neural network trained with training data including the general body motion range, or a smoothing step for removing an outlier by averaging 3D EDMs or pieces of joint information within a predetermined sequence range among a plurality of 3D EDMs or a plurality of pieces of joint information generated according to sequences and correcting a 3D EDM or joint information based on the average.

Further, the error corrector may be configured to further perform a reverse correction step for correcting the angle of the joint outside the general body motion range included in the 3D EDM based on the joint information corrected in the error correction step.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a diagram illustrating an image information acquisition step and a two-dimensional (2D) EDM generation step according to an embodiment of the present invention;

FIGS. 8A and 8B are diagrams illustrating (2-1)$^{th}$ deep learning neural networks according to an embodiment of the present invention.

DETAILED DESCRIPTION OF THE INVENTION

Figure 1:
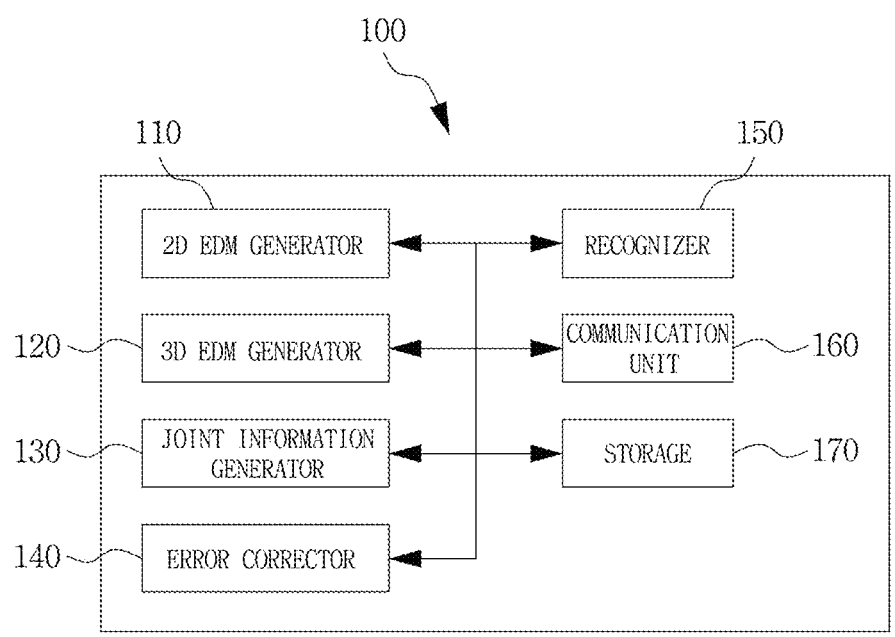
FIG. 1 is a block diagram illustrating an apparatus for recognizing a sign language or a gesture by a three-dimensional (3D) Euclidean distance matrix (EDM) according to an embodiment of the present invention.

The objects, specific advantages, and novel features of the present invention will become more apparent from the following detailed description and preferred embodiments, examples of which are illustrated in the accompanying drawings. The same reference numerals and signs denote the same or like components even when they are shown in different accompanying drawings from one another. The terms as used herein, "one surface", "the other surface", "1$^{st}$", "2$^{nd}$", "first", and "second' are used only to distinguish one component from another component, not limiting the components. Lest it should obscure the subject matter of the present invention, a detailed description of well-known technologies is avoided.

An embodiment of the present invention will be described below in detail with reference to the attached drawings.

Figure 2:
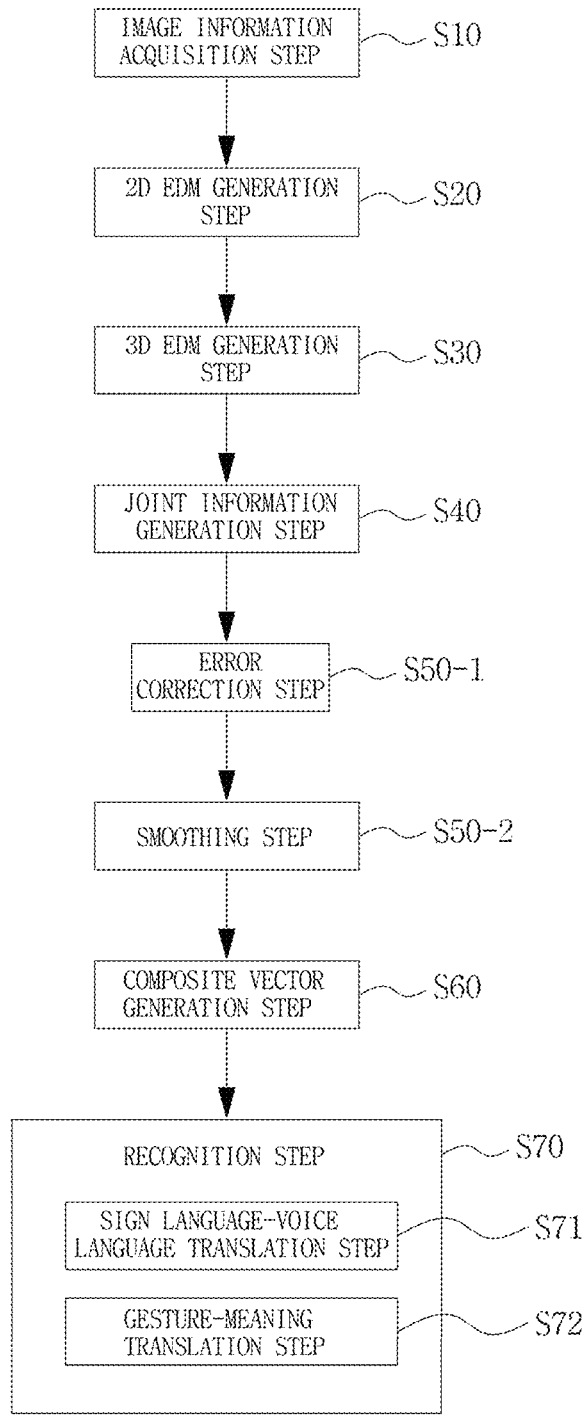
FIG. 2 is a flowchart illustrating the steps of a method of recognizing a sign language or a gesture by a 3D EDM according to an embodiment of the present invention.

FIG. 1 is a block diagram illustrating an apparatus 100 for recognizing a sign language or a gesture by using a three-dimensional (3D) Euclidean distance matrix (EDM) according to an embodiment of the present invention, and FIG. 2 is a flowchart illustrating the steps of a method of recognizing a sign language or a gesture by using a 3D EDM according to an embodiment of the present invention.

In the present specification, the apparatus 100 for recognizing a sign language or a gesture by using a 3D EDM may be referred to shortly as the "sign language or gesture recognizing apparatus 100". A sign language may refer to one or more gestures in its meaning. In the present specification, a person using a sign language or making a gesture is referred to shortly as a "sign language user".

As illustrated in FIG. 1, the sign language or gesture recognizing apparatus 100 using a 3D EDM according to an embodiment of the present invention may include a two-dimensional (2D) EDM generator 110 that generates a 2D EDM including information about the distances between feature points P of a body recognized in image information Iinfo, a 3D EDM generator 120 that receives the 2D EDM and generates a 3D EDM based on the 3D EDM by using a first deep learning neural network DNN-1 trained with training data in which input data is a 2D EDM and correct answer data is a 3D EDM, and a recognizer 150 that recognizes a sign language or a gesture based on the 3D EDM.

The sign language or gesture recognizing apparatus 100 may further include a communication unit 160 and a storage 170. The communication unit 160 may transmit data to and receive data from a camera 101 or other information processing devices. The communication unit 160 may transmit data received from the outside to an internal component of the sign language or gesture recognizing apparatus 100. The storage 170 may store program code that may implement the method of recognizing a sign language or a gesture by using a 3D EDM according to an embodiment of the present invention in a computer device, and store the image information Iinfo or a translated voice language sentence.

As illustrated in FIG. 2, the method of recognizing a sign language or a gesture by using a 3D EDM according to an embodiment of the present invention may include a 2D EDM generation step S20 for generating a 2D EDM including information about the distances between feature points P of a body recognized in image information Iinfo by the 2D EDM generator 110, a 3D EDM generation step S30 for receiving the 2D EDM and generating a 3D EDM based on the 2D EDM by using the first deep learning neural network DNN-1 trained with training data in which input data is a 2D EDM and correct answer data is a 3D EDM, and a recognition step S70 for recognizing a sign language or a gesture based on the 3D EDM.

The image information Iinfo is image data generated by capturing a sign language user with the camera 101 (see FIG. 3). When the distance, angle, height, direction, or the like of the camera 101 capturing the sign language user is changed in the process of capturing the sign language user and generating the image information Iinfo, a gesture of the sign language user may be recorded from a different direction in a different size in each piece of image information Iinfo, despite the same sign language or gesture. In this case, the accuracy of sign language or gesture recognition may vary greatly depending on a direction and a distance from which the same sign language is captured.

In an embodiment of the present invention, the 2D EDM generator 110 receives the image information Iinfo and performs the 2D EDM generation step S20. In the 2D EDM generation step S20, the feature points P of the body of the sign language user included in the image information Iinfo are recognized, and the 2D EDM is generated by using the coordinates of the feature points P. The image information Iinfo may include a plurality of frame images, and each frame image may be described in a 2D coordinate system defined by width (the X axis) and height (the Y axis) (see FIG. 3). Feature points P of the body of the sign language user recognized in any frame of the image information Iinfo may have coordinate values in the form of (X, Y). Body parts of the sign language user recognized as feature points P may be the positions of joints such as the wrists, elbows, shoulders, finger joints, and finger tips, or some points on the facial contour, eyebrows, eyes, nose, and mouth of the sign language user.

A 2D EDM represents information about the distances or position relationship between any feature point P and the other feature points P as an m×n 2D matrix. If the coordinates of feature points P of the body are processed to a 2D EDM, the position relationship between the feature points P does not change as far as the same motion is captured at the same angle, even though the camera 101 is near to or far from the sign language user. In an embodiment of the present invention, the use of 2D EDMs enables sign language or gesture recognition robust against a change in a capturing distance.

Because the 2D EDM includes only the 2D position relationship between the feature points P in any frame of the image information Iinfo, the 2D EDM does not include information about coordinates in a frame depth direction (see the Z axis in FIG. 3). In an embodiment of the present invention, the 3D EDM generator 120 generates a 3D EDM based on the 2D EDM by performing the 3D EDM generation step S30. The 3D EDM further includes information about the position relationship between the feature points P of the body in the frame depth (Z axis) direction. That is, the 3D EDM includes information about the distance between the feature points P in a 3D space.

The first deep learning neural network DNN-1 trained with training data in which a 2D EDM is input data and a 3D EDM is correct answer data may generate the 3D EDM by estimating a 3D position relationship between the feature points P of the body based on the 2D position relationship between the feature points P of the body, as trained. The first deep learning neural network DNN-1 will be described later.

Even from image information Iinfo generated by capturing the same sign language or gesture at a different angle, a 3D EDM with recovered depth information may be obtained by generating a 2D EDM and inputting the 2D EDM to the first deep learning neural network DNN-1, and thus it may be recognized that the sign language user expresses the same sign language or gesture. Accordingly, the use of 3DMs enables sign language or gesture recognition robust against a change in a capturing angle in an embodiment of the present invention.

In an embodiment of the present invention, the recognizer 150 may perform the recognition step S70. A sign language-voice language translation step S71 for receiving a sign language sentence including a sequence of 3D EDMs and translating the sign language sentence to a voice language sentence by using a $(2-1)^{th}$ deep learning neural network DNN-2-1 trained with training data in which input data includes 3D EDMs and correct answer data is a voice language sentence, or a gesture-meaning translation step S72 for receiving a gesture including a sequence of 3D EDMs and translating the gesture to a gesture meaning by using a $(2-2)^{th}$ deep learning neural network DNN-2-2 trained with training data in which input data includes 3D EDMs and correct answer data is a gesture meaning may be performed in the recognition step S70.

That is, the recognizer 150 may recognize a sign language or a gesture as a voice language sentence or a gesture meaning. A voice language sentence may include a sequence of one or more words that may be represented as voice or text. A gesture has a general meaning.

The recognizer 150 may translate a sign language sentence to a voice language sentence by performing the sign language-voice language translation step S71. The image information Iinfo includes a sign language sentence composed of continuous gestures made by the sign language user. A sign language sentence including a sequence of 3D EDMs may be obtained by generating a 3D EDM for each frame included in the image information Iinfo or for each frame selected from the image information Iinfo according to a predetermined criterion. A sequence refers to arrangement of a plurality of 3D EDMs or voice language words in order. The recognizer 150 may generate a voice language sentence by inputting a sign language sentence including a sequence of 3D EDMs to the $(2-1)^{th}$ deep learning neural network DNN-2-1. The $(2-1)^{th}$ deep learning neural network DNN-2-1 will be described later.

The recognizer 150 may translate a gesture to a gesture meaning by performing a gesture-meaning translation step S72. The image information Iinfo includes one or more continuous gestures made by the sign language user. A gesture including a sequence of 3D EDMs may be obtained by generating a 3D EDM for each frame of the image information Iinfo or for each frame selected from the image information Iinfo according to a predetermined criterion. A sequence refers to arrangement of a plurality of 3D EDMs or gesture motions in order. The recognizer 150 may input the gesture including the sequence of 3D EDMs to the $(2-2)^{th}$ deep learning neural network to recognize a gesture meaning. The $(2-2)^{th}$ deep learning neural network may be identical in structure to the $(2-1)^{th}$ deep learning neural network, and may be trained with training data in which input data includes a gesture and correct answer data includes a gesture meaning.

In an embodiment of the present invention, because 3D EDMs with recovered depth information are generated from 2D EDMs based on the image information Iinfo and used as input data for sign language or gesture recognition, depth-related information about the feature points P of the body may further be used during sign language or gesture recognition, thereby enabling more accurate sign language or gesture recognition.

In summary, 3D EDMs including depth information about a person's pose may be generated based on 2D EDMs by using the deep learning neural networks, and relative positions of joints may be effectively determined by using the 3D EDMs invariant against capturing angles or directions in the embodiment of the present invention. Therefore, a sign language or gesture may be recognized and translated more accurately. Now, a detailed description will be given of a detailed configuration and specific steps according to an embodiment of the present invention.

FIG. 3 is a diagram illustrating the image information acquisition step S10 and the 2D EDM generation step S20 according to an embodiment of the present invention.

As illustrated in FIGS. 2 and 3, the image information acquisition step S10 may be followed by the 2D EDM generation step S20. In the image information acquisition step S10, the camera 101 generates the image information Iinfo by capturing the sign language user and provides the image information Iinfo to the sign language or gesture recognizing apparatus 100. The sign language or gesture recognizing apparatus 100 receives the image information Iinfo generated by the camera 101. The sign language or gesture recognizing apparatus 100 and the camera 101 may be wiredly or wirelessly connected to each other, directly or through a network. The sign language or gesture recognizing apparatus 100 may receive the image information Iinfo in real time or the image information Iinfo as recorded. Upon acquisition of the image information Iino, the sign language or gesture recognizing apparatus 100 performs the 2D EDM generation step S20.

As illustrated in FIGS. 2 and 3, the 2D EDM generation step S20 may include a feature point extraction step S21 for extracting feature points P of the body from the image information Iinfo by the 2D EDM generator 110, and an EDM generation step S22 for generating a 2D EDM by developing information about the distances between the feature points P into a Euclidean distance matrix by the 2D EDM generator 110. The 2D EDM generation step S20 may be performed for each frame of the image information Iinfo or for each of some frames selected from among a plurality of frames of the image information Iinfo.

In the feature point extraction step S21, the 2D EDM generator 110 extracts the feature points P by recognizing the body of the sign language user included in any frame of the image information Iinfo. The feature points P refer to body parts selected for sign language or gesture recognition. For example, as illustrated in FIG. 3, the feature points P may be formed on the eyes, nose, mouth, facial contour, shoulders, elbows, wrists, finger joints, and so on. The feature points P may be assigned identification numbers so that the feature points P may be distinguished from each other. For example, as illustrated in FIG. 3, identification numbers may be assigned such that P(C) indicates the feature point P of a shoulder, P(A) indicates the feature point P of an elbow, and P(B) indicates the feature point of a wrist.

In the EDM generation step S22, the 2D EDM generator 110 may recognize the coordinates of the feature points P extracted in the feature point extraction step S21 and process the position relationship between the feature points P to an EDM. The 2D EDM generator 110 may acquire the coordinates of the feature pints P(A), P(B), P(C), . . . , according to the width X and height Y of the frame, thus acquiring raw data for EDM generation as illustrated in FIG. 3. The 2D EDM generator 110 may calculate the position relationships between any feature point P and all of the other feature points P and generate a 2D EDM such that left-bottom triangle values are symmetrical to right-top triangle values with respect to a diagonal line drawn from a left-top end to a right-bottom end.

For example, as illustrated in FIG. 3, a 2D EDM may be generated with six feature points P, A, B, C, D, E, and F. In consideration of the connection relationships of six coordinate pairs, a total of 15 connection relationships exist. When the connection relationships are stored in a 6×6 matrix, the matrix becomes a symmetrical matrix with 0s as diagonal entries, which is symmetrical with respect to the diagonal line. The 2D EDM is a 2D m×m square matrix where m may be determined to be the number of all feature points P that the 2D EDM generator 110 may extract from the image information Iinfo or the number of feature points that the 2D EDM generator 110 has extracted from the image information Iinfo. The 2D EDM may include all feature points P that the 2D EDM generator 110 may extract from the image information Iinfo, with the coordinates of a feature point P absent in the image information Iinfo and thus not extracted left empty. For example, when the 2D EDM generation step S20 is performed for a frame of a captured image in which the mouth is covered with a hand, a 2D EDM may be generated with the coordinates of a feature point P corresponding to the mouth part covered by the hand left empty.

Because the image information Iinfo includes a sequence of a plurality of frames, the 2D EDM generator 110 generates a sequence of a plurality of 2D EDMs. The 2D EDM generator 110 may generate 2D EDMs and provide the 2D EDM in sequence to the 3D EDM generator 120. Once the 2D EDMs are generated, the sign language or gesture recognizing apparatus 100 performs the 3D EDM generation step S30.

As illustrated in FIG. 2, the 3D EDM generator 120 receives the 2D EDMs and generates 3D by using the first deep learning neural network DNN-1 trained with training data in which input data is a 2D EDM and correct answer data is a 3D EDM. The first deep learning neural network DNN-1 may be configured in a fully connected layer structure illustrated in FIG. 4A or a convolutional layer structure illustrated in FIG. 4B.

Figure 4A:
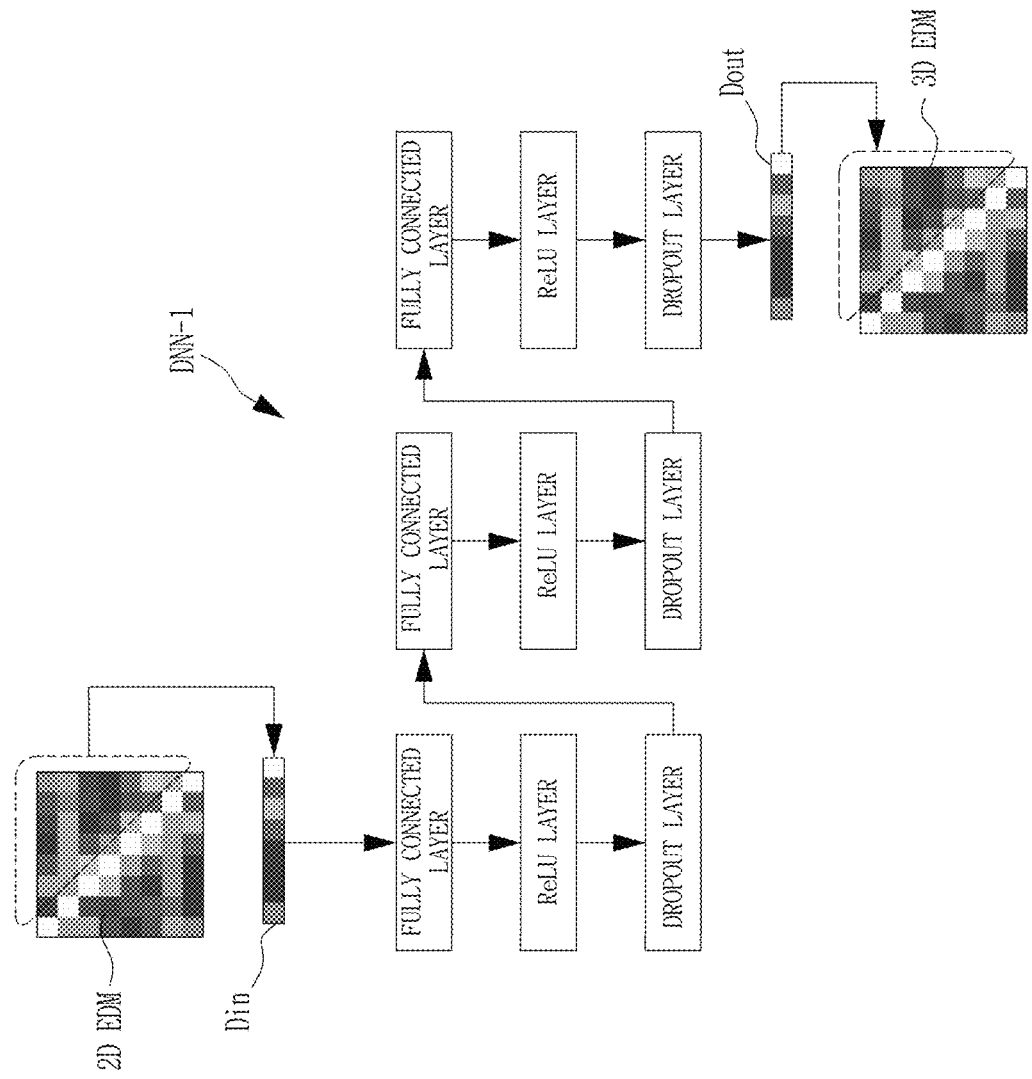
FIGS. 4A and 4B are diagrams illustrating a first deep learning neural network according to an embodiment of the present invention.
Figure 4B:
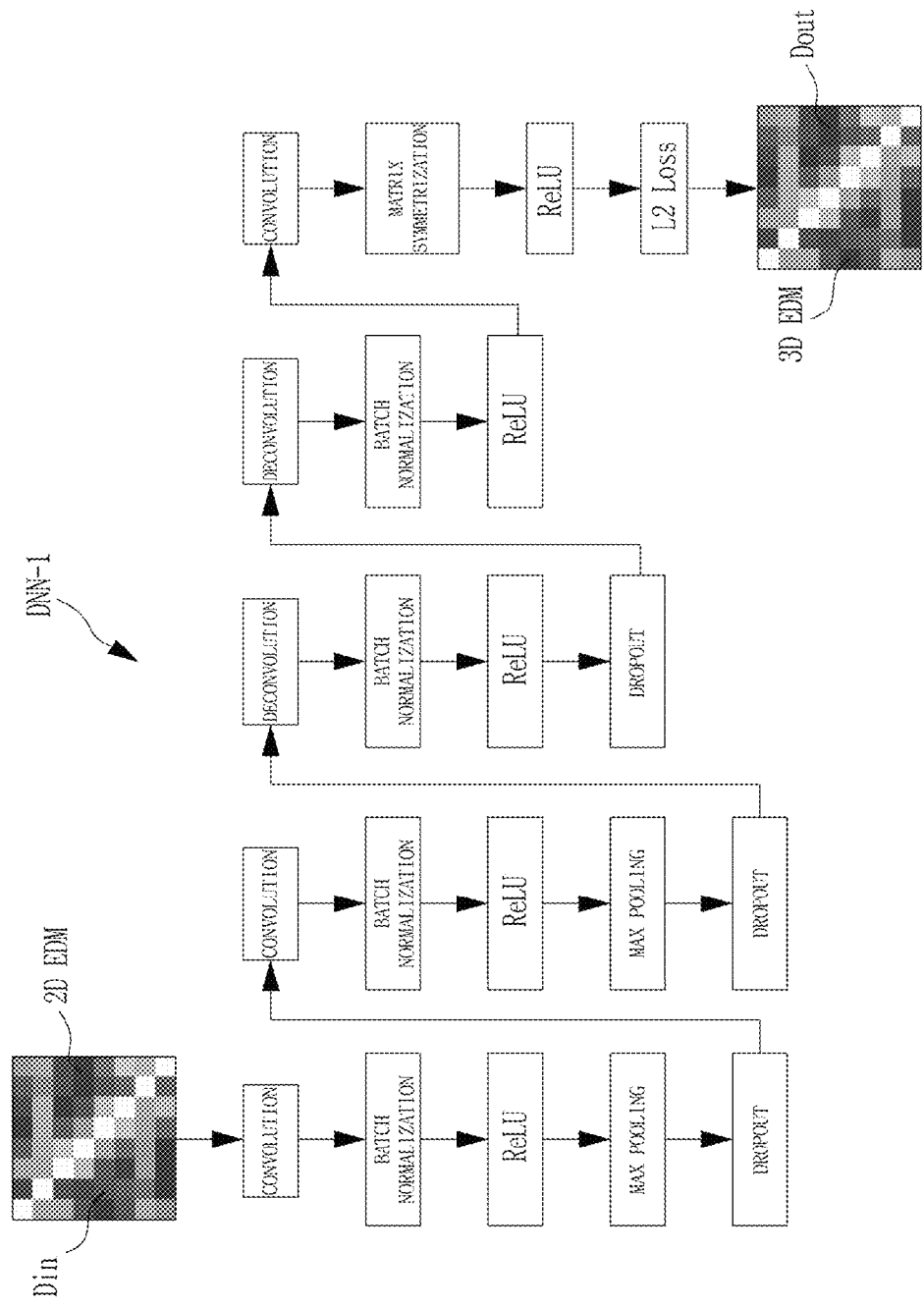

FIGS. 4A and 4B are diagrams illustrating the first deep learning neural network DNN-1 according to an embodiment of the present invention.

As illustrated in FIG. 4A, the first deep learning neural network DNN-1 may be formed in the fully connected layer structure that obtains outputs by repeating a linear layer, a rectified linear units (ReLU) layer, and a dropout layer in any dimensions, performs back propagation at an L2 LOSS layer such that the sum of the squares of the differences between the outputs and correct answer data is minimized, and uses a one-dimensional (1D) vector converted from the right-top triangle values of a 2D EDM as input data. Because the right-top triangle values are equal to the left-bottom triangle values in the 2D EDM, even the use of only the 1D vector converted from the right-top triangle values as input data amounts to use of the position relationship between all feature points P as an input. The first deep learning neural network DNN-1 of the fully connected layer structure may be trained with training data in which input data is a 1D vector converted from the right-top triangle values of a 2D EDM and correct answer data is a 1D vector converted from the right-top triangle values of a 3D EDM.

The 3D EDM generator 120 receives, as an input Din, the 1D vector converted from the right-top triangle values of the 2D EDM and generates a 3D EDM based on a 1D vector Dout received from the first deep learning neural network DNN-1. In this manner, the 3D EDM is generated from the 2DM.

As illustrated in FIG. 4B, the first deep learning neural network DNN-1 may be formed in a convolutional layer structure that receives a 2D EDM as input data, recovers the 2D EDM to an original size through two steps of a convolutional layer, a batch normalization layer, an ReLU layer, and a dropout layer and then another two steps of a deconvolutional layer, the batch normalization layer, and the ReLU layer, obtains output values by multiplying a linear matrix at each position of the matrix, and performs back propagation at an L2 LOSS layer such that the sum of the squares of the differences between the output values and answer data is minimized.

The first deep learning neural network DNN-1 of the convolutional layer structure may use a 2D EDM square matrix as an input. If the input data, 2D EDM is of size m×m, the size of the matrix becomes "n/4×n/4×any number of channels" after two steps of the convolutional layer, the batch normalization layer, the ReLU layer, and the dropout layer. When the original size is recovered by another two steps of the deconvolutional layer, the batch normalization layer, and the ReLU layer, the size of the matrix becomes "n×n×any number of channels". The size of the output is recovered to the original size of the 2D EDM as the input data, "n×n" by multiplying an "any number of channels×1" linear matrix at each position of the square matrix. The first deep learning neural network DNN-1 is trained by performing back propagation by comparing the "n×n" output with the correct answer data at the L2 LOSS layer such that the sum of the squares of the differences between the output and the answer data is minimized.

The 3D EDM generator 120 provides the 2D EDM in a matrix structure as the input Din to the trained first deep learning neural network DNN-1 of the convolutional layer structure and generates a 3D EDM in a matrix structure as the output Dout from the first deep learning neural network DNN-1. Thus, the 3D EDM is generated from the 2D EDM.

Irrespective of the structure of the first deep learning neural network DNN-1, input data of training data is a 2D EDM generated by extracting feature points P from the image information Iinfo, and correct answer data is a 3D EDM in which the distance relationship between the feature points P recognized from the image information Iinfo is represented in a 3D space. The training data may be generated by capturing one sign language or gesture at various angles and distances, or by modifying existing data. The trained first deep learning neural network DNN-1 may recover the position relationship between the feature points P in the 3D space from the input 2D EDM based what the first deep learning neural network DNN-1 has learned. Therefore, in an embodiment of the present invention, the accuracy of sign language or gesture recognition and translation may be increased just with the image information Iinfo acquired by the general 2D RGB camera 101, without using special equipment such as sensor gloves, the depth camera 101, or a plurality of cameras at different capturing positions.

Figure 5:
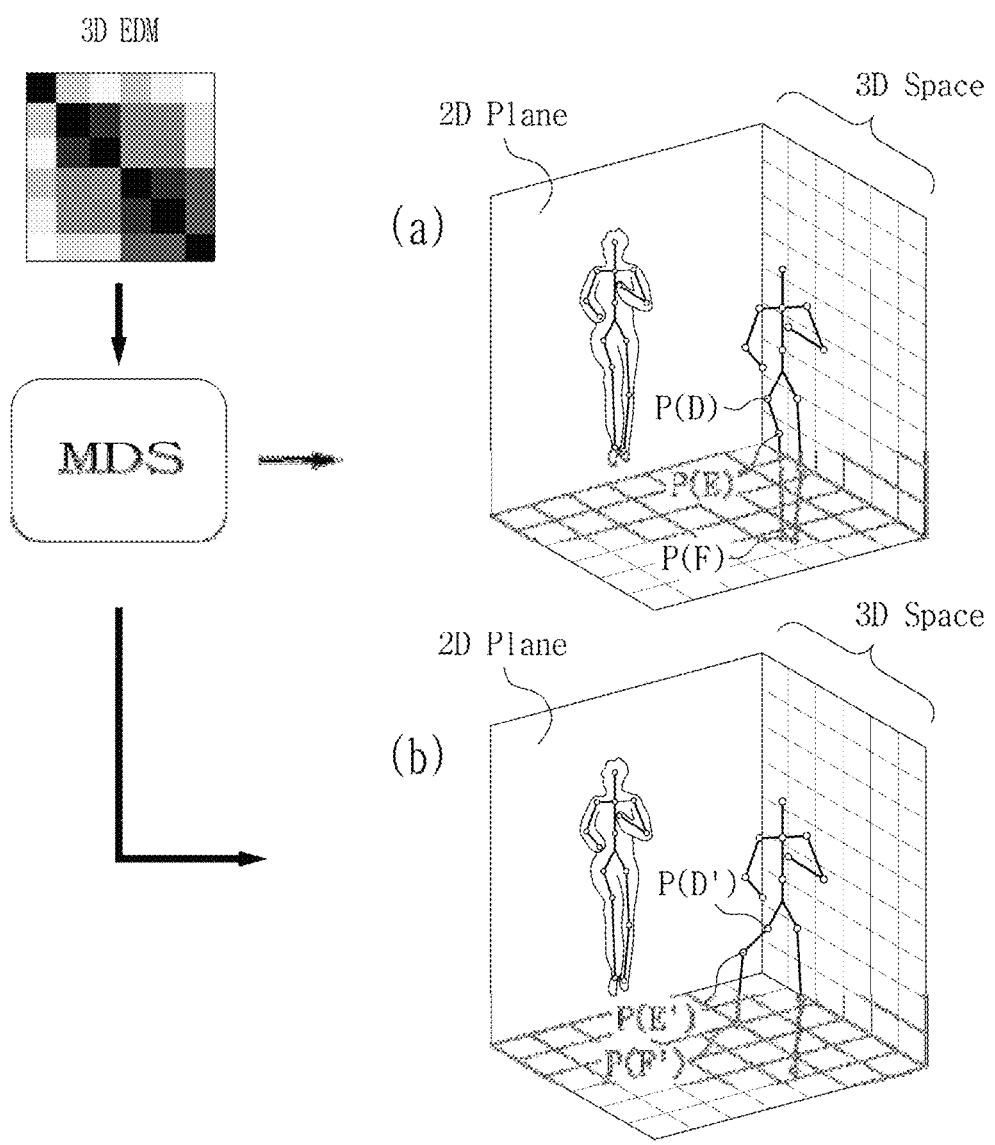
FIG. 5 is an exemplary diagram illustrating the 3D coordinates of feature points estimated based on a 3D EDM according to an embodiment of the present invention.

FIG. 5 is an exemplary diagram illustrating the 3D coordinates of feature points P estimated based on a 3D EDM according to an embodiment of the present invention. (a) of FIG. 5 illustrates the coordinates of feature points P acquired from a frame of image information Iinfo on a 2D plane and the coordinates of the feature points P estimated by multi-dimensional scaling (MDS) in a 3D space, when depth information about the feature points P is recovered without errors during 3D EDM estimation. (b) of FIG. 5 illustrates the coordinates of the same feature points P as illustrated in (a) of FIG. 5 on the 2D plane and the coordinates of the feature points P estimated by MDS in the 3D space, when an error occurs during recovery of the depth information about the feature points P during the 3D EDM estimation.

As illustrated in FIG. 5, the coordinates of the feature points P in the 3D space may be estimated by performing MDS on the 3D EDM.

Because the 3D EDM includes information related to the depths of the feature points P recovered based on information that the first deep learning neural network DNN-1 has learned, there may be an error during the recovery. For example, in many cases such as when a specific body part is covered by another body part and thus is not recognized as a feature point P in a frame of the image information Iinfo or when a feature point P is located at a position where it may have two or more depths, an error may occur so that depth information about the feature point P is recovered abnormally.

In the absence of any error in the 3D EDM, as illustrated in (a) of FIG. 5, the feature points P(D), P(E), and P(F) represent the buttocks, a knee, and an ankle, respectively, and the angle (<DEF) between a line connecting between the feature points P(D) and P(E) and a line connecting between the feature points P(E) and P(F) is included within an angle range in which a knee is generally bent. However, in the presence of an error in the 3D EDM, as illustrated in (b) of FIG. 5, the angle (<D'E'F') between a line connecting between feature points P(D') and P(E') and a line connecting between feature points P(E') and P(F') may be outside the angle range in which a knee is generally bent and recovered to an impossible state in which the knee is bent reversely.

The presence of such an error in the 3D EDM may decrease the accuracy of sign language or gesture recognition and translation. Therefore, the error needs correction.

Referring to FIG. 1 again, the apparatus 100 for recognizing a sign language or a gesture by using a 3D EDM according to an embodiment of the present invention may further include a joint information generator 130 that recognizes the angles of joints of the body to generate joint information based on a 3D EDM, and an error corrector 140 that corrects the angle of a joint outside a general body motion range in the joint information.

Referring to FIG. 2 again, the method of recognizing a sign language or a gesture by using a 3D EDM according to an embodiment of the present invention may further include a joint information generation step S40 for recognizing the angles of joints of the body to generate joint information based on a 3D EDM by the joint information generator 130 after the 3D EDM generation step S30, and an error correction step S50-1 for correcting the angle of a joint outside a general body motion range in the joint information by the error corrector 140 after the joint information generation step S40.

In an embodiment of the present disclosure, as joint information including information about angles at which joints of the body are bent based on a 3D EDM and an error is corrected in the joint information, the error of wrongly recovering depth information, which may occur during 3D EDM recovery may be eliminated, thereby increasing the accuracy of sign language recognition and translation.

As illustrated in FIG. 2, the joint information generator 130 may acquire joint information which is information about the angles between joints based on information about the distances of feature points P in a 3D space included in a 3D EDM by performing the joint information generation step S40. As illustrated in FIG. 5, the 3D coordinates of the feature points P may be estimated by MDS of the 3D EDM and the angles between joints may be acquired based on the coordinates of the feature points P. For example, the joint information may include information about the angle (<DEF) between the line connecting between the feature points P(D) and P(E) and the line connecting between the feature points P(E) and P(F) based on the 3D coordinates of the feature point P(D) of the buttocks, the feature point P(E) of the knee, and the feature point P(F) of the ankle in (a) of FIG. 5. The joint information may represent the angles of the joints connecting a plurality of feature points P in the form of a matrix. Once the joint information is generated, the sign language or gesture recognizing apparatus 100 may perform the error correction step S50-1 to correct an error which may be included in the joint information.

The error corrector 140 of the sign language or gesture recognizing apparatus 100 may receive the joint information and generate corrected joint information by correcting the angle of a joint outside the general body motion range in the joint information by using a third deep learning neural network DNN-3 trained with training data including the general body motion range in the error correction step S50-1.

The error correction step S50-1 is a step for receiving the joint information and generating the corrected joint information by correcting the angle of a joint outside the general body motion range in the joint information by using the third deep learning neural network DNN-3 trained with training data including the general body motion range, and recovering a joint angle related to a feature point not recognized in the 2D EDM generation step by the error corrector 140.

Figure 6:
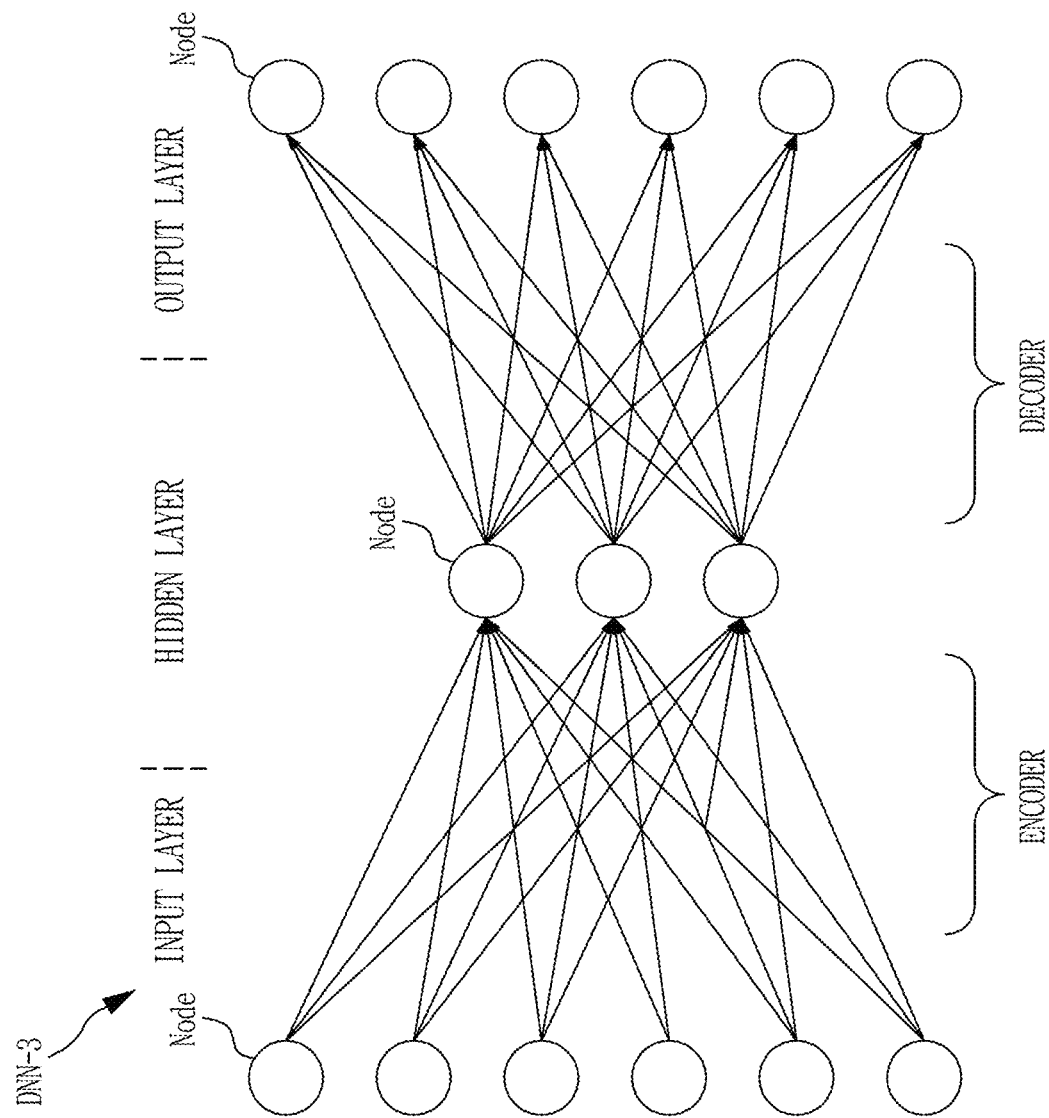
FIG. 6 is a diagram illustrating a third deep learning neural network according to an embodiment of the present invention.

FIG. 6 is a diagram illustrating the third deep learning neural network DNN-3 according to an embodiment of the present invention.

The third deep learning neural network DNN-3 included in the error corrector 140 may be formed in an auto-encoder structure illustrated in FIG. 6. In the third deep learning neural network DNN-3, an encoder and a decoder are concatenated, the encoder translates input data to an internal representation, and the decoder converts the internal representation to an output. The auto-encoder of the third deep learning neural network DNN-3 includes fewer nodes in a hidden layer than in an input layer or an output layer, and may learn a joint angle possible in a general body by using the 3D coordinates of feature points P existing within a normal body motion range as training data (input data and correct answer data). The training data may include joint information including a joint angle possible in a general human body as input data, and the same joint information as the input data as correct answer data.

Therefore, even though joint information about an impossible joint angle is input to the third deep learning neural network DNN-3, the encoder of the trained third deep learning neural network DNN-3 may generate an internal representation with a reduced effect of the impossible joint angle, and the decoder may output corrected joint information including a normal joint angle. Further, even though there is a feature point which has not been extracted in the 2D EDM generation step and thus information about the feature point does not exist in the 2D EDM and the 3D EDM, the trained third deep learning neural network DNN-3 may recover joint information about the absent feature point because the third deep learning neural network DNN-3 has learned information about joint angles possible in the general body. Therefore, the corrected joint information acquired by performing the error correction step S50-1 includes information about all feature points, and includes joint angle information corresponding to the normal body motion range.

Because an error in depth information, which may occur in the process of generating a 3D EDM from a 2D EDM, may be corrected based on a general human joint motion range, a relative position of a joint may be determined more accurately, thereby increasing the accuracy of sign language or gesture recognition in an embodiment of the present disclosure. Further, owing to learning of information about the general body motion range, joint information about an non-extracted feature point P may be recovered. Therefore, a relative position of a joint may be determined more accurately, thereby increasing the accuracy of sign language or gesture recognition.

The error corrector 140 of the sign language or gesture recognizing apparatus 100 may further perform a reverse correction step for correcting a joint angle outside the general body motion range included in the 3D EDM based on the joint information corrected in the error correction step S50-1.

Because the joint information is acquired from the coordinates of feature points P in the 3D space, estimated by MDS of the 3D EDM, correction of the joint information is not equivalent to correction of an error in the 3D EDM.

The error corrector 140 may generate a 3D EDM based on the joint information corrected in the error correction step S50-1. An error occurring in the first deep learning neural network DNN-1 has been corrected in the 3D EDM generated based on the joint information. In an embodiment of the present invention, the accuracy of sign language recognition and translation may be increased by using the 3D EDM in which a probable error is corrected.

Although the sign language user actually makes a gesture in a continuous trajectory, the coordinates of a feature point P may have an outlier very different from the coordinates of the feature point P in the previous or next sequence in continuous sequences of a plurality of 3D EDMs in the processes of generating the image information Iinfo through the camera 101, extracting the feature points P by the 2D EDM generator 110, and recovering the depth information about the feature points P by the 3D EDM generator 120. This outlier may decrease the accuracy of sign language or gesture recognition and translation, and thus needs correction.

Figure 7:
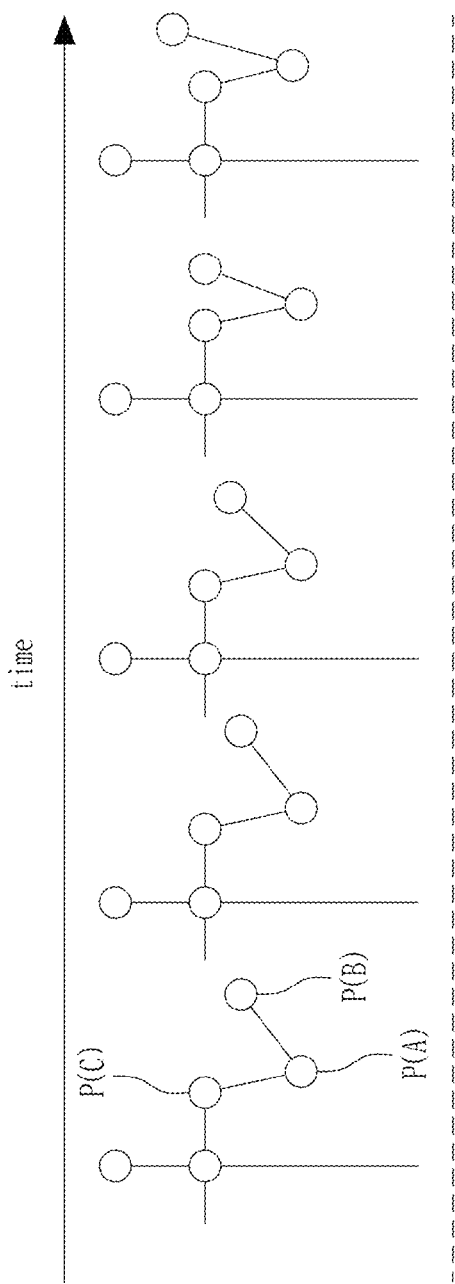
FIGS. 7 (*a*) and 7 (*b*) are diagrams illustrating a smoothing step according to an embodiment of the present invention.
Figure 7:
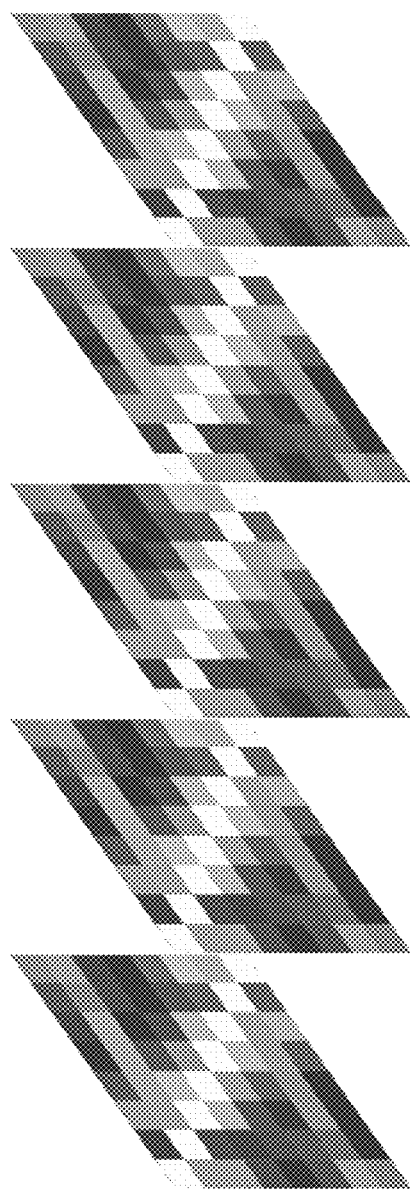

FIGS. 7 (a) and (b) are diagrams illustrating a smoothing step S50-2 according to an embodiment of the present invention. FIG. 7 (a) illustrates changes in the coordinates of feature points P in the form of skeletons in time order, and FIG. 7 (b) illustrates 3D EDMs including changes in the coordinates of feature points P in time order.

The error corrector 140 of the sign language or gesture recognizing apparatus 100 may perform the smoothing step S50-2 for averaging 3D EDMs or joint information within a predetermined sequence range among a plurality of 3D EDMs or a plurality of pieces of joint information generated according to sequences. The method of recognizing a sign language or a gesture by using a 3D EDM according to an embodiment of the present invention may further include the smoothing step S50-2 for averaging 3D EDMs or joint information within the predetermined sequence range among a plurality of 3D EDMs or a plurality of pieces of joint information generated according to sequences.

To correct a 3D EDM in the smoothing step S50-2, the error corrector 140 may calculate the average of the 3D EDM, J 3D EDMs before the 3D EDM, and K 3D EDMs after the 3D EDM. For example, since a plurality of 3D EDMs are generated according to sequences, the average of a total of five 3D EDMs which are a 3D EDM, two previous 3D EDMs, and two following 3D EDMs is calculated and then the value of the 3D EDM is changed based on the average. An outlier existing in a 3D EDM corresponding to a specific sequence may be removed by performing the smoothing step S50-2 for the 3D EDMs of all sequences.

The error corrector 140 may perform the smoothing step S50-2 for joint information to remove an outlier in the joint information. That is, the error corrector 140 may perform the smoothing step S50-2 to remove an outlier in a 3D EDM or joint information. In an embodiment of the present invention, since an outlier is removed from a 3D EDM or joint information by performing the smoothing step S50-2, the accuracy of sign language or gesture recognition and translation may be increased.

The sign language or gesture recognizing apparatus 100 generates a 2D EDM from the image information Iinfo, generates a 3D EDM, corrects a probable error or outlier in the 3D EDM, and then translates a sign language sentence to a voice language sentence.

FIGS. 8A and 8B are diagrams illustrating the $(2-1)^{th}$ deep learning neural network DNN-2-1.

The recognizer 150 translates a sign language sentence to a voice language sentence by using the $(2-1)^{th}$ deep learning neural network DNN-2-1. The $(2-1)^{th}$ deep learning neural network DNN-2-1 is trained with training data in which input data includes a 3D EDM and correct answer data is a voice language sentence. The $(2-1)^{th}$ deep learning neural network DNN-2-1 may be formed in a sequence-to-sequence structure including an encoder and a decoder, and translate a sign language sentence input in the form of a sequence of 3D EDMs to a voice language sentence correct in voice language grammars.

The input data of the $(2-1)^{th}$ deep learning neural network DNN-2-1 may be a composite vector formed to include one or more of a 3D EDM, joint information, error-corrected joint information, and a 3D EDM generated by the corrected joint information. The recognizer 150 may perform a composite vector generation step S60 for generating a composite vector in an appropriate form according to the structure of the $(2-1)^{th}$ deep learning neural network DNN-2-1.

In the $(2-1)^{th}$ deep learning neural network DNN-2-1, the encoder may be formed as a 3D convolutional neural network structure or a long short-term memory (LSTM) structure, and the decoder may be formed in the LSTM structure.

As illustrated in FIG. 8A, the $(2-1)^{th}$ deep learning neural network DNN-2-1 may be in the sequence-to-sequence structure including an encoder EN-2 and a decoder DE-2. The encoder EN-2 may be a 3D convolutional neural network that receives a first composite vector in a matrix structure including a 3D EDM and corrected joint information according to a sequence and computes a predetermined number of first composite vectors by a 3D filter, and the decoder DE-2 may be an LSTM-based recurrent neural network. The $(2-1)^{th}$ deep learning neural network DNN-2-1 may be trained with training data in which input data is a first composite vector and correct answer data is a voice language sentence. In the sign language-voice language translation step S71, the recognizer 150 may input a sign language sentence including a sequence of 3D EDMs and joint information to the $(2-1)^{th}$ deep learning neural network DNN-2-1 trained with the training data to translate the sign language sentence to a voice language sentence.

When the encoder of the $(2-1)^{th}$ deep learning neural network DNN-2-1 is a 3D convolutional neural network, the recognizer 150 may combine a 3D EDM and joint information into a matrix in the composite vector generation step S60. As illustrated in FIG. 8A, a first composite vector is generated by combining a 3D EDM with joint information at each sequence, and a sequence of a plurality of first composite vectors may be input to the encoder of the 3D convolutional neural network structure.

In the sign language-voice language translation step S71, the $(2-1)^{th}$ deep learning neural network DNN-2-1 receives a sequence of a plurality of first composite vectors and encode the first composite vectors through the 3D convolutional neural network and provides the encoded result to the decoder of the LSTM structure, so that a voice language sentence is output in units of a token TK, as indicated by Dout. A token TK may be a phrase unit, a word unit, a morpheme unit, or a text unit including a word spacing in a voice language. As illustrated in FIG. 8A, the decoder of the $(2-1)^{th}$ deep learning neural network DNN-2-1 sequentially outputs a first token TK-1 (I), a second token TK-2 (am), and a third token TK-3 (fine) on a word basis in voice language grammars, thus translating the sign language to the voice language sentence "I am fine". When the translation is completed, a TK end may be output.

As illustrated in FIG. 8B, the $(2-1)^{th}$ deep learning neural network DNN-2-1 is in a sequence-to-sequence structure including the encoder EN-2 and the decoder DE-2. The encoder EN-2 is an LSTM-based recurrent neural network which receives and computes a second composite vector generated from a 1D vector converted from a 3D EDM and corrected joint information at each sequence by a concatenation function. The decoder DE-2 is an LSTM-based recurrent neural network. The $(2-1)^{th}$ deep learning neural network DNN-2-1 may be trained with training data in which input data is a second composite vector and correct answer data is a voice language sentence. In the sign language-voice language translation step S71, the recognizer 150 may input a sign language sentence including a sequence of 3D EDMs and joint information to the $(2-1)^{th}$ deep learning neural network DNN-2-1 so that the sign language sentence is translated to a voice language sentence.

When the encoder of the $(2-1)^{th}$ deep learning neural network DNN-2-1 is an LSTM-based recurrent neural network, the recognizer 150 may form a second composite vector by converting 3D EDMs and corrected joint information to 1D vectors and concatenating the 1D vectors in the composite vector generation step S60. For example, if the size of 3D EDM information is F and the size of joint information is G, the size of the second composite vector is F+G. As illustrated in FIG. 8B, a second composite vector may be formed by combining a 3D EDM with joint information at each sequence, and a sequence of a plurality of second composite vectors may be sequentially input to the encoder of the LSTM structure.

In the sign language-voice language translation step S71, the $(2-1)^{th}$ deep learning neural network DNN-2-1 receives a sequence of a plurality of second composite vectors, encodes the sequence of the second composite vectors through the LSTM-based recurrent neural network, and provides the encoded result to the decoder of the LSTM structure so as to output a voice language sentence, token by token. A token may be a phrase unit, a word unit, a morpheme unit, or a text unit including a spacing in the voice language. As illustrated in FIG. 8B, the decoder of the $(2-1)^{th}$ deep learning neural network DNN-2-1 sequentially outputs a first token TK-1 (I), a second token TK-2 (am), and a third token TK-3 (fine) on a word basis according to voice language grammars, thus translating the sign language to the voice language sentence "I am fine". When the translation is completed, a TK end may be output.

As is apparent from the above description, according to an embodiment of the present invention, a 3D EDM including depth information about a human pose may be generated based on a 2D EDM by using a deep learning neural network.

Further, according to an embodiment of the present invention, because a relative position of a joint may be effective identified by using a 3D EDM invariant against capturing angles or directions, the accuracy of sign language or gesture recognition may be increased.

Further, according to an embodiment of the present invention, an error that may occur to depth information during generation of a 3D EDM from a 2D EDM may be corrected based on a general human joint motion range, and thus a relative position of a joint may be more accurately determined. Therefore, the accuracy of sign language or gesture recognition may be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of recognizing a sign language or a gesture by using a three-dimensional (3D) Euclidean distance matrix (EDM), the method comprising:
   generating a two-dimensional (2D) EDM including information about distances between feature points of a body recognized in image information by a 2D EDM generation processor;
   converting the 2D EDM to a 3D EDM to generate the EDM by inputting the 2D EDM to an input layer of a first deep learning neural network, trained with training data in which input data is a 2D EDM and correct answer data is a 3D EDM by a 3D EDM generation processor, configured to provide the 3D EDM, corresponding to the 2D EDM being input, from an output layer of the first deep learning neural network; and
   recognizing a sign language or a gesture based on the 3D EDM,
   wherein the image information is image data including frame images generated by capturing a user expressing the sign language or gesture with the 2D camera,
   wherein the feature points refer to body parts of the user shown in the frame image, and are selected for sign language or gesture recognition, and have the coordinate values in the form of (X, Y) according to the width (X-axis) and height (Y-axis) of the frame image,
   wherein the 2D EDM represents 2D position relationship between any feature point and the other feature points in the frame image, which is a two-dimensional space, and
   wherein the 3D EDM represents 3D position relationship between any feature point and the other feature points in a three-dimensional space, which further include depth direction (Z-axis) of the frame image.

2. The method according to claim 1, wherein the generating of the 2D EDM comprises:
   extracting the feature points of the body from the image information and recognizing coordinates of the feature points by the 2D EDM generation processor; and generating the 2D EDM by developing the information about the distances between the feature points into an EDM by the 2D EDM generation processor.

3. The method according to claim 1, further comprising:
generating joint information by recognizing angles of joints of the body based on the 3D EDM by a joint information generation processor, after generating the 3D EDM; and
correcting the angle of a joint outside a general body motion range in the joint information by an error correction processor, after generating the joint information,
wherein the joint information represents angles of joints connecting a plurality of feature points in the form of a matrix.

4. The method according to claim 3, wherein the error correction processor receives the joint information and generates corrected joint information by correcting the angle of the joint outside the general body motion range in the joint information and recovering an angle of a joint related to a feature point unrecognized in generating the 2D EDM by using a third deep learning neural network trained with training data including the general body motion range.

5. The method according to claim 4, further comprising removing an outlier by averaging 3D EDMs or pieces of joint information within a predetermined sequence range among a plurality of 3D EDMs or a plurality of pieces of joint information generated according to sequences and correcting a 3D EDM or joint information based on the average by the error correction processor.

6. The method according to claim 1, wherein the first deep learning neural network is in a fully connected layer structure or a convolutional layer structure, the fully connected layer structure obtaining output values by repeating a linear layer, a rectified linear units (ReLU) layer, and a dropout layer in any dimensions in three steps, performing back propagation to minimize the sum of the squares of differences between the output values and correct answer values, and using a vector converted from top-right triangle values of a 2D EDM as input data, and the convolutional layer structure receiving a 2D EDM, recovering the 2D EDM to an original size through two steps of a convolutional layer, a batch normalization layer, an ReLU layer, and a dropout layer and then two steps of a deconvolutional layer, the batch normalization layer, and the ReLU layer, obtaining output values by multiplying a linear matrix at each position of the matrix, and performing back propagation to minimize the sum of the squares of differences between the output values and correct answer values.

7. The method according to claim 1, wherein the recognizing further comprises:
receiving a sign language sentence including a sequence of 3D EDMs and translating the sign language sentence to a voice language sentence by using a (2-1)th deep learning neural network trained with training data in which input data includes a 3D EDM and correct answer data is a voice language sentence, or
receiving a gesture including a sequence of 3D EDMs and translating the gesture to a gesture meaning by using a (2-2)th deep learning neural network trained with training data in which input data includes a 3D EDM and correct answer data is a gesture meaning.

8. The method according to claim 7, wherein the (2-1)th deep learning neural network is in a sequence-to-sequence structure including an encoder and a decoder, the encoder being a 3D convolutional neural network that receives a first composite vector in a matrix structure including the 3D EDM and the corrected joint information according to a sequence, and computes a predetermined number of first composite vectors by a 3D filter, and the decoder being a long short-term memory (LSTM)-based recurrent neural network structure,
wherein in the training data, input data is the first composite vector and correct answer data is a voice language sentence, and
wherein a sign language sentence including a sequence of 3D EDMs and joint information is input to the (2-1)th deep learning neural network trained with the training data and translated to a voice language sentence.

9. The method according to claim 7, wherein the $(2-1)^{th}$ deep learning neural network is in a sequence-to-sequence structure including an encoder and a decoder, the encoder being an LSTM-based recurrent neural network that receives and computes a second composite vector generated by converting the 3D EDM and the corrected joint information to a one-dimensional (1D) vector at each sequence and then subjecting 1D vectors to a concatenation function, and the decoder being an LSTM-based recurrent neural network structure,
wherein in the training data, input data is the second composite vector and correct answer data is a voice language sentence, and
wherein a sign language sentence including a sequence of 3D EDMs and joint information is input to the $(2-1)^{th}$ deep learning neural network trained with the training data and translated to a voice language sentence.

10. An apparatus for recognizing a sign language or a gesture by using a three-dimensional (3D) Euclidean distance matrix (EDM), the apparatus comprising:
one or more processors configured to:
generate a 2D EDM including information about distances between feature points of a body recognized in image information;
convert the 2D EDM to a 3D EDM to generate the 3D EDM by inputting the 2D EDM to an input layer of a first deep learning neural network, trained with training data in which training input data is a 2D EDM and correct answer data, as training output data, is a 3D EDM, configured to provide the 3D EDM, corresponding to the 2D EDM being input, from an output layer of the first deep learning neural network; and
recognize a sign language or a gesture based on the 3D EDM,
wherein the image information is image data including frame images generated by capturing a sign language user expressing sign language or gesture with the 2D camera,
wherein the feature points refer to body parts of the user shown in the frame image, and are selected for sign language or gesture recognition, and have the coordinate values in the form of (X, Y) according to the width(X-axis) and height(Y-axis) of the frame image,
wherein the 2D EDM represents 2D position relationship between any feature point and the other feature points in the frame image, which is a two-dimensional space, and
wherein the 3D EDM represents 3D position relationship between any feature point and the other feature points in a three-dimensional space, which further include depth direction(Z-axis) of the frame image.

11. The apparatus according to claim 10, wherein the one or more processors are configured to:
receive a sign language sentence including a sequence of 3D EDMs and translate the sign language sentence to a voice language sentence by using a (2-1)$^{th}$ deep learning neural network trained with training data in which input data includes a 3D EDM and correct answer data is a voice language sentence, or receive a gesture including a sequence of 3D EDMs and translate the gesture to a gesture meaning by using a (2-2)$^{th}$ deep learning neural network trained with training data in which input data includes a 3D EDM and correct answer data is a gesture meaning.

12. The apparatus according to claim 10, wherein the one or more processors are further configured to:

generate joint information by recognizing angles of joints of the body based on the 3D EDM; and correct the angle of a joint outside a general body motion range in the joint information and recover an angle of a joint related to a feature point which has not been recognized by the 2D EDM generation processor, and wherein the joint information represents angles of joints connecting a plurality of feature points in the form of a matrix.

13. The apparatus according to claim 12, wherein the one or more processors are configured to:

receive the joint information and generate corrected joint information by correcting the angle of the joint outside the general body motion range in the joint information and recover an angle of a joint related to a feature point unrecognized in generating the 2D EDM by using a third deep learning neural network trained with training data including the general body motion range, or remove an outlier by averaging 3D EDMs or pieces of joint information within a predetermined sequence range among a plurality of 3D EDMs or a plurality of pieces of joint information generated according to sequences and correcting a 3D EDM or joint information based on the average.

14. The apparatus according to claim 12, wherein the one or more processors are configured to further perform a reverse correction for correcting the angle of the joint outside the general body motion range included in the 3D EDM based on the joint information corrected in the error correction.

* * * * *